United States Patent [19]

Pederson et al.

[11] 4,188,042
[45] Feb. 12, 1980

[54] LOG TRAILER ASSEMBLY

[76] Inventors: Brian L. Pederson, 2411 Yew St.; Stephen F. Pederson, 2535 Michigan St., both of Bellingham, Wash. 98225

[21] Appl. No.: 898,109

[22] Filed: Apr. 20, 1978

[51] Int. Cl.$^2$ .............................................. B60P 3/40
[52] U.S. Cl. .................................. 280/404; 280/143
[58] Field of Search ............. 280/404, 143, 145, 148, 280/142, 146; 177/137

[56] References Cited

U.S. PATENT DOCUMENTS

| | | | |
|---|---|---|---|
| 1,570,165 | 1/1926 | Merrill | 280/143 X |
| 3,350,116 | 10/1967 | Skirvin et al. | 280/404 |
| 3,370,866 | 2/1968 | Mitchell et al. | 280/404 |
| 3,873,129 | 3/1975 | Schmidt | 280/404 |

Primary Examiner—John A. Pekar

[57] ABSTRACT

A log carrying trailer chassis especially constructed to withstand the compressive and shear loads exerted on a trailer chassis while also being lighter in weight, thereby increasing the payload to be carried. The chassis assembly comprises a chassis frame having a central body portion, two laterally spaced-apart legs depending from the central body portion, and two shoulder portions located at the top of the body portion directly above the leg portion. The chassis is constructed without the use of a bridge beam common to the prior art chassis, and the reach tube is contructed with opposing sides offset 45° from the horizontal and vertical axes. The primary load bearing member is a rotary thrust bearing centrally mounted on top of the central body portion, so that the weight of the log load is transmitted downwardly through the center of the chassis through plate support means mounted in the central body portion beneath the rotary thrust bearing, and then to the wheels.

9 Claims, 5 Drawing Figures

LOG TRAILER ASSEMBLY

BACKGROUND OF THE INVENTION

A. Field of the Invention

The present invention relates to log carrying trailers, and particularly to an improved chassis of a log carrying trailer.

B. Description of the Prior Art

Truck-trailer units are generally utilized in the hauling of cut timber from a cutting area to a mill site to be processed. The terrain over which trucks and trailers haul logs is extremely rough, characterized by unpaved, rarely graded gravel roads cut from forested areas for the express purpose of removing logs. As a result, the equipment used to haul logs, and especially the trailer chassis, which typically must support a load of up to 28,600 pounds, is subjected to tremendous stresses as they are driven down steep uneven mountain logging roads. Consequently, there is experienced in the log hauling business numerous equipment failures, including structural damage to the trailer chassis.

The typical prior art trailer chassis design comprises three basic elements: first, the log bunk which retains the logs on the chassis in a secure fashion; secondly, a bridge beam pivotally connected to the log bunk; and thirdly, the main chassis portion which is affixed to the multiple axles commonly used. The log bunk is affixed to the bridge beam by a "cup and saucer" apparatus which permits rotation of the bunk on top of the permanently affixed bridge beam. The bridge beam is necessary due to the system of measuring the weight of logs carried, which is commonly done by scale pads near the outermost lateral end of the bridge beam. The bridge beam is fixedly attached to the chassis, and at the lateral uppermost edges of the chassis, where it is in partial contact with the bridge beam, there are the compression scale pad devices used to weigh the log load.

The prior art chassis design is commonly a truncated "A" shape, with a flat horizontally-aligned upper surface, to which is affixed the bridge beam, and a pair of outwardly flared depending legs which are the primary support structures of the chassis. There is a walking beam axle member attached to the lower portion of each leg, which is supported typically on two pairs of wheels on each side of the chassis.

The chassis portion of the prior art trailer design has front and back sides, a flat top portion and lateral sides extending from the upper surface to the bottom of the legs. There is no enclosing lower portion connecting the front and back sides. The legs are typically made of one piece of heavy gauge rolled steel which is bent in a three-sided fashion to resemble a block "C", with the side facing the opposing leg open, as well as the bottom facing portion between the front and back sides. There is typically a structual bracing member welded between the legs on the inside of the front and back pieces.

In the conventional prior art logging truck trailer chassis, at the approximate center of the upper portion, there is a through hole extending through the chassis extending from front to back, the through hole being four-sided and either square or rectangular in shape. With tubular extensions from the front and back sides at the through hole, a reach tube is formed which accepts the reach, an extensible elongate member attaching the trailer chassis to the towing vehicle. The reach tube has the four sides aligned parallel and perpendicular to the flat top portion of the main chassis.

U.S. Pat. No. 3,370,866, Mitchell, et al, discloses one type of prior art log trailer chassis with an improved supporting member for the log bunk. The wear surfaces of the supporting members are replaceable within permanent turntable members, and the rub irons subject to wear are also replaceable.

U.S. Pat. No. 3,350,116, Skirvin, et al, shows a bunk which is easily rotatable about a vertical axis relative to the trailer for use in hauling very long logs. The rub irons are provided with bearings to allow the bunk to more easily rotate about the center vertical axis.

Because the durability of a log carrying trailer chassis is of primary importance due to the rough conditions under which it is utilized, there is a need for a trailer chassis which will withstand the stresses to which it is subjected with less down time for maintenance, and also have a longer life span. The chassis is continually subjected to stresses not only from the rough road bed but also from the shifting and bouncing of the logs carried thereon. Thus, the chassis must be constructed so that the stresses are distributed in a manner that no portion of the chassis is subjected to excessive loading.

Also, because the gross weight of the truck-trailer combination with a load of logs is regulated by statute, it is desirable to produce a carrying vehicle which weighs as little as possible, since every pound of weight reduction on the hauling vehicle results in an extra pound of logs which may be carried. For the independent or company logger, this means that more payload may be hauled per mile driven, thus decreasing the overall transportation costs.

In view of the foregoing, it is an object of the present invention to provide a log trailer chassis which weighs less than the conventional log trailer chassis currently in use, yet has improved stress-bearing characteristics resulting in less equipment failure and maintenance cost.

SUMMARY OF THE INVENTION

In the present invention, there is a trailer assembly adapted to carry a load, such as a load of logs, which comprises a chassis frame having a central body portion, two laterally spaced leg portions connected at the bottom of the body and two laterally spaced shoulder portions located at the top of the body on opposite sides thereof. There are support means to support a bunk member which is positioned above the frame, the support means comprising a main rotary thrust bearing mounted to the top of the body portion at the center thereof, and two auxiliary support members mounted to the shoulder portions on opposite sides of the thrust bearing. The main rotary thrust bearing transmits the major thrust forces from the bunk member directly to the body portion and provides the major support for the bunk. The auxiliary support members provide direct auxiliary support for the bunk member on either side thereof. There is a reach tube adapted to receive a reach which extends through the body portion at a location beneath the rotary thrust bearing. Plate support means are centrally mounted in the body portion and are rigidly connected to one another to form a support column which extends vertically from the rotary thrust bearing downwardly to transmit force loads from the rotary thrust bearing to the legs. A pair of walking beams mounted one to each of said leg portions are center mounted to a related leg with forward and rear ends adapted to be connected to forward and rear wheels.

The walking beams are adapted to carry strain gauges which measure the forces transmitted from the log load through the chassis frame and then to the walking beam, as a means of determining the weight of the load carried on the bunk.

The plate support means are rigidly connected to one another to form a box-like support structure which is adapted to support vertical force loads, and extends from the rotary thrust bearing downwardly into the body portion. The box-like support structure comprises forward, rear and opposing side plates rigidly connected to one another in rectangular configuration.

The reach tube comprises a plurality of flat plates defining a through opening, two of the plates being upper plates joined to one another at an upper ridge line which extend downwardly and outwardly from one another at a 45° angle from the vertical axis. The two upper plates are adapted to receive downward thrust loads and to transmit the thrust loads downwardly and outwardly in the chassis frame. The two lower plates of the reach tube slant from the upper plates downwardly and inwardly toward one another at a 45° angle from the vertical axis, and in conjunction with the upper plates form a generally rectangular through opening which receives the reach. The column support structure is adapted to transmit downward force loads at least partially through the upper plates of the reach tube.

Each of the leg portions comprises a vertically oriented column-like leg structure extending downwardly from the body portion to receive vertical thrust loads from the body portion. There is a reinforcing web means extending between the leg portions which resists lateral tension loads exerted on the leg portions due to the downward and outward thrust loads exerted from the rotary thrust bearing through the body portion to the leg portion.

There is a yielding positioning means connecting the chassis frame to the axles so as to yieldingly resist rotational movement of the axles relative to the walking beam to which they are affixed.

DESCRIPTION OF THE PREFERRED EMBODIMENT

It is believed that a better appreciation of the novel features of the present invention will be obtained by first reviewing the typical prior art log trailer assembly now commonly in use in the logging industry and its mode of operation, and then describing the present invention and its mode of operation.

Figure 1:
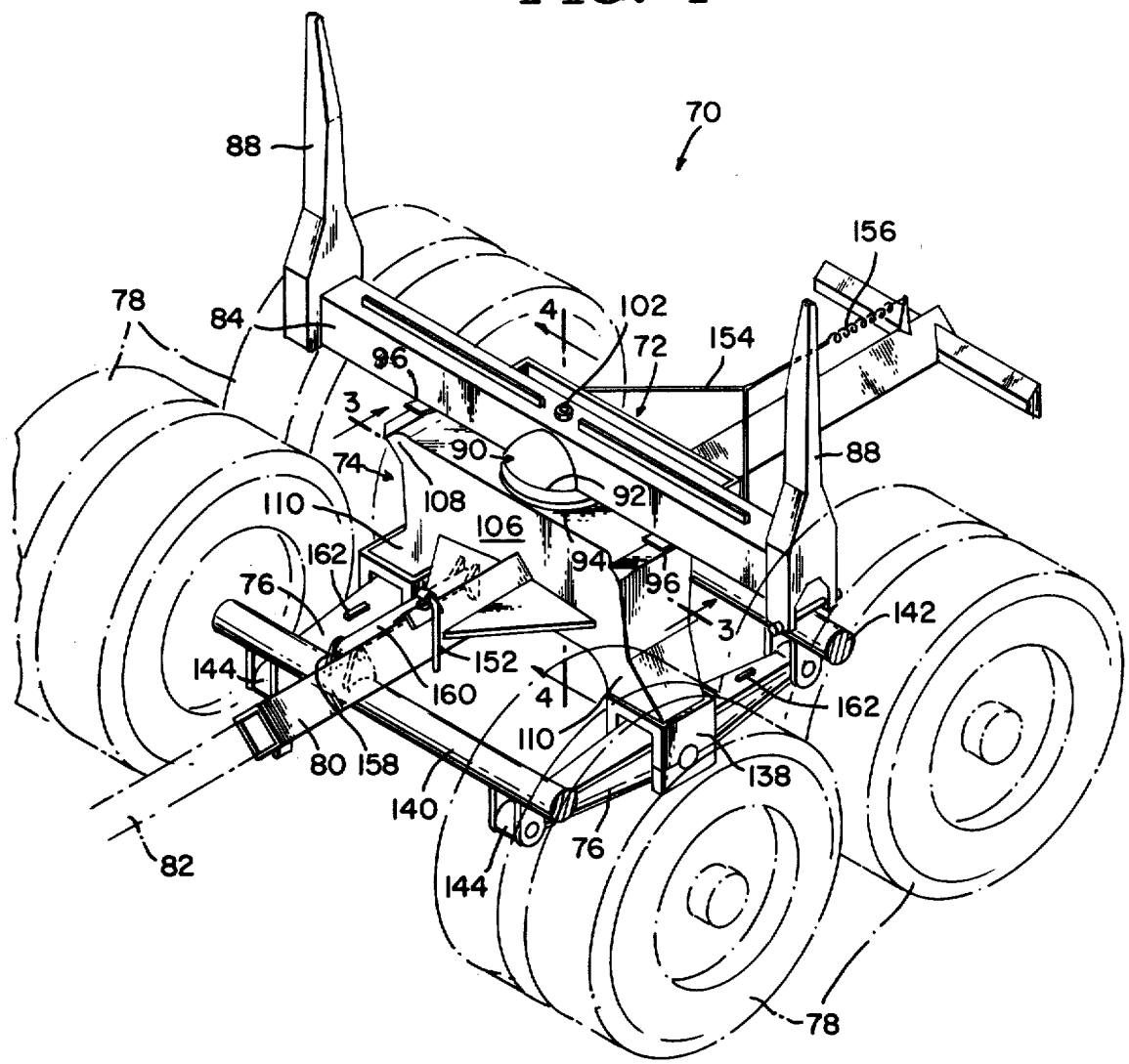
FIG. 1 is an isometric view illustrating the log trailer assembly of the present invention as it would appear without a log load thereon.
Figure 2:
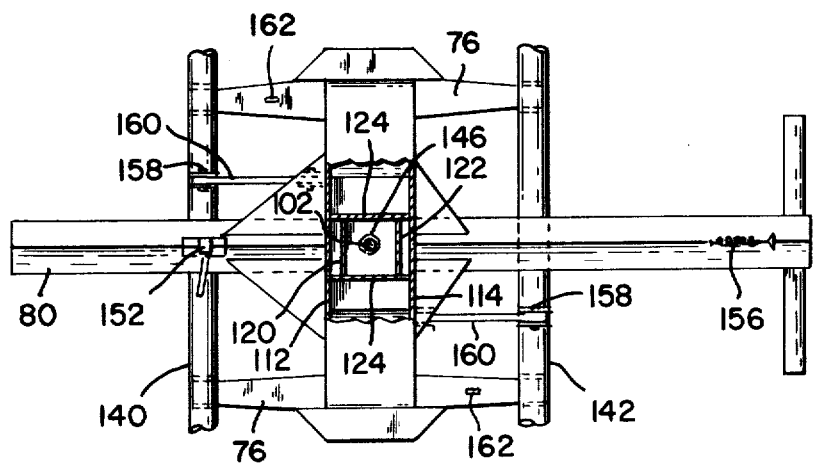
FIG. 2 is a partial top isometric view of the vertically oriented support plates within the trailer chassis.
Figure 3:
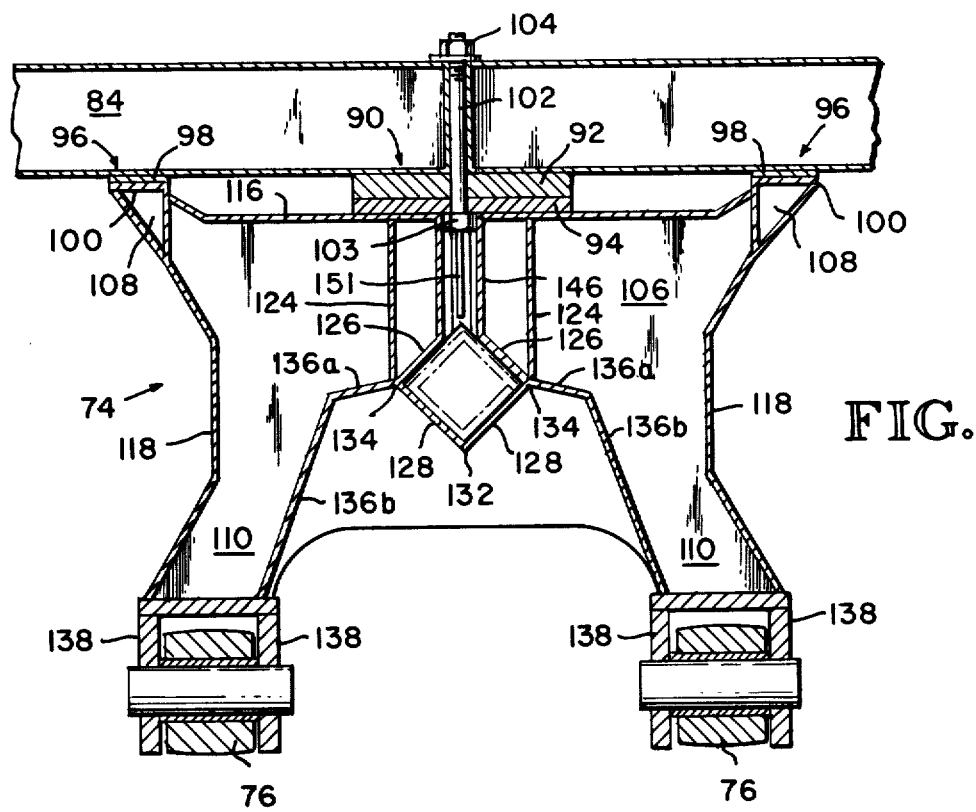
FIG. 3 is a transverse sectional view taken along line 3—3 of FIG. 1.
Figure 4:
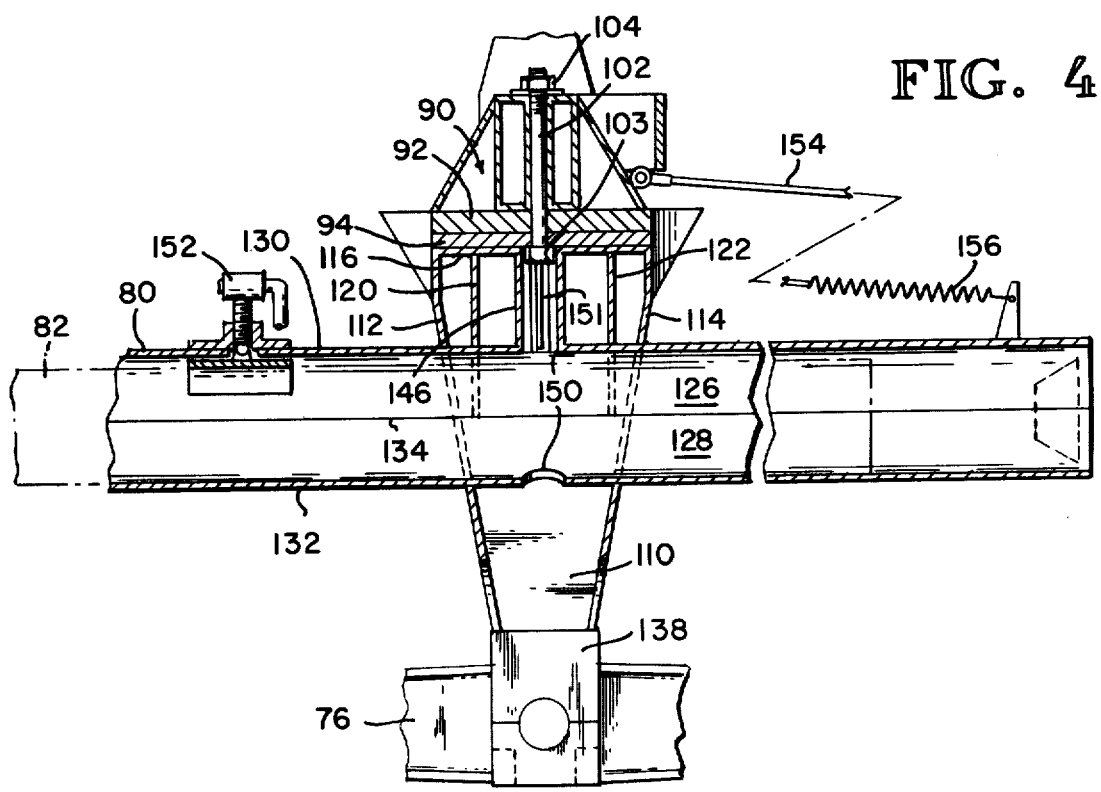
FIG. 4 is a longitudinal sectional view taken along 4—4 of FIG. 1.
Figure 5:
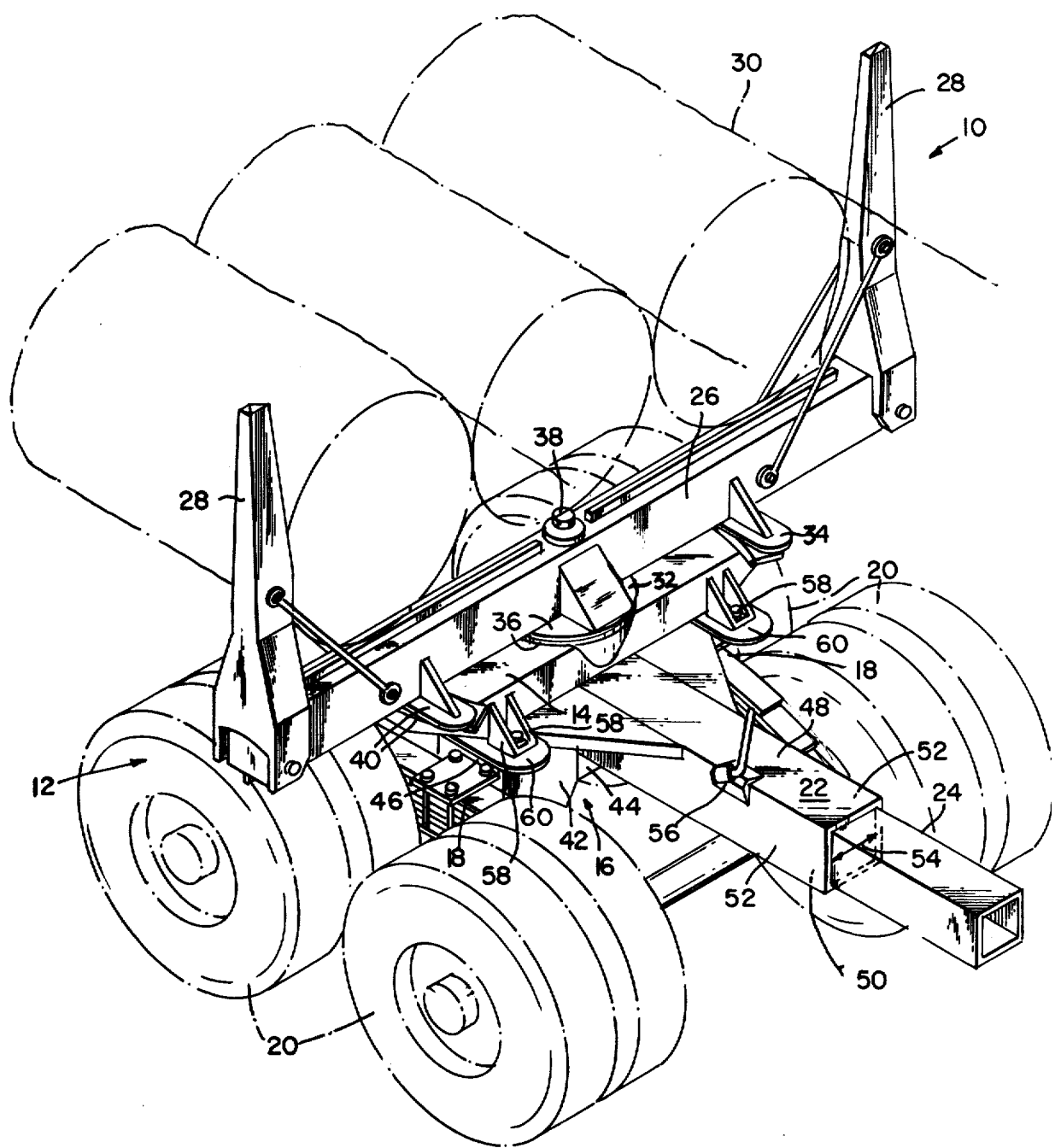
FIG. 5 is an isometric view illustrating a prior art log trailer chassis.

A typical prior art trailer assembly is shown at 10 in FIG. 5 and is labeled as "Prior Art". The prior art trailer assembly 10 comprises the following main components:

a. a log carrying member 12 (commonly called the "bunk");

b. a bridge beam 14 which supports the bunk 12;

c. a chassis frame 16 supporting the bridge beam 14;

d. two spring assemblies 18 trunion mounted on opposite sides of the chassis frame 16;

e. four sets of wheels 20 mounted to front and rear ends of the spring assemblies 18, a reach tube 22 positioned in the chassis frame 16 at the longitudinal center liner thereof; and f. a reach 24 having a rear end positioned in the reach tube 22 and a forward end which connects to a truck which tows the trailer assembly 10.

The bunk 12 comprises a laterally positioned main support beam 26 and two upstanding stakes 28 mounted on opposite ends of the beam 26. These stakes 28 can be released downwardly in order to release a load of logs 30, carried by the beam 26.

The bunk 12 is supported from the bridge beam 14 by a centrally mounted rotary thrust bearing 32 (commonly called the "cup and saucer"), and two pair of bearing plates 34 (commonly called "rub irons") positioned on opposite sides of the thrust bearing 32. The rotary thrust bearing comprises upper and lower bearing plates 36 joined by a connecting pin 38, with one bearing plate 36 being fixedly connected to the main support beam 26 of the bunk 12, and the other bearing plate 36 being fixed to the bridge beam 14. Each pair of rub irons 40 has one of the irons 40 fixedly connected to the main support beam 26 of the bunk 12, and the other rub iron 40 is connected to the bridge beam 14.

The main chassis frame 16 has two depending leg portions 42 which give the chassis frame 16 an overall truncated "A" configuration. There is structural bracing in the form of webbing 44 welded to the inner surface of the chassis frame 16 at front and rear locations and extending across the chassis frame 16.

Each spring assembly 18 comprises a set of longitudinally extending leaf springs trunion mounted at 46 to a lower end of a related leg portion 42 of the chassis frame 16. As indicated above, the wheels 20 are mounted to the front and rear ends of the two spring assemblies 18.

The reach tube 22 comprises a longitudinally aligned elongate structure comprising top, bottom and side plates 48, 50 and 52 respectively, joined one to another to define a rectangularly shaped through opening. The top and bottom plates 48 and 50 are horizontally aligned and the side plates 52 vertically aligned. The reach 24 has a rectangular configuration and is made slightly smaller than the opening 54 defined by the reach tube 22 so that the reach 24 can move into the reach tube 22. The reach 24 is secured at any particular position in the reach tube 24 by tightening a reach clamp 56, thereby fixing the distance behind the hauling vehicle which the trailer assembly 10 will trail.

The bridge beam 14 is connected at its two outer end portions to the chassis frame 16 by means of mounting brackets 58. Scale pads 60 are mounted between the bridge beam 14 and the chassis frame 16 at the location of the mounting brackets 58. These scale pads 60 are utilized to measure the weight of the logs 30 carried on the bunk 12 by means of a hydraulic compression system.

With regard to the mode of operation of the prior art trailer 10, there are three main considerations, namely:

a. the manner in which the weight of the logs 30 is supported;

b. the manner in which the trailer assembly is towed; and c. how the weight of the logs 30 is determined.

Probably the most important consideration is the manner in which the weight of the logs is supported, and more specifically how the weight from the logs is transmitted through the structure of the trailer assembly 10 to the underlying ground surface. With the load of logs 30 distributed evenly on the bunk 12 and with the trailer assembly 10 stationary, the force loads of the logs 30 bear directly on the main support beam 26 of the bunk 12 to be transmitted primarily through the rotary thrust bearing 32 to the center of the bridge beam 14. The bridge beam 14 accepts this loading in bending moment and transmits these loads outwardly to its end bearing points which are at the location of the mounting brackets 58. The two substantially equal force loads at the mounting brackets 58 are transmitted as compression loads downwardly through the leg portions 42 of the chassis frame 16, then through the spring assemblies 18 to the wheels 20. In terms of function, the chassis frame 16 at the location of its leg portions 42 provides support in the manner of two column-like structures from the location of the mounting brackets 58 downwardly to the location of the turnion mounts 46 of the spring assemblies 18.

With regard to the function of determining the weight of the logs 30, as indicated previously herein, this is done by means of the scale pads 60. Thus, weight is determined by ascertaining the force loads of the log 30 at the end points of the bridge beam 26.

With regard to towing the trailer assembly 10, the forward tension load applied to the reach 24 by the towing vehicle is transmitted into the reach tube 22, and through the chassis frame 16 to the other components of the trailer assembly 10. The reach 24 and reach tube 22 do not contribute to any significant extent to the function of providing vertical support for the logs 30.

Let us now give consideration to the dynamic loading on the prior art trailer assembly 10, when it is traveling over an uneven surface, such as a logging road. As the wheels 20 on one side of the trailer assembly 10 encounter bumps on the logging road, there are abrupt vertical loads exerted upwardly through one side of the chassis frame 16 to the adjacent end of the bridge beam 14. On the other hand, when the wheels 20 on that side of the trailer assembly 10 encounter a depression in the logging road the wheels move downwardly into the depression to essentially remove underlying support from that side of the chassis frame 16. The effect of this is that unequal and constantly changing vertical force loads are exerted upwardly and downwardly on opposite sides of the chassis frame 16. In a high production logging operation, the trailer assemblies 10 are usually pulled over the logging roads at a sufficiently high speed so that rather substantial impact loads are transmitted upwardly through the sides of the chassis frame 16, and it is not uncommon for the rather high shear loads eventually to cause structural damage, particularly in the area of the reinforcing webbing 44 which has the primary function of carrying these shear loads. The solution of these problems has been in the prior art to make the structural components more rugged and add reinforcing, all of which adds to the weight of the trailer assembly and also to the cost of manufacturing the same.

It is with the foregoing considerations in mind that the trailer assembly of the present invention was conceived.

The trailer assembly 70 of the present invention comprises:

a. a bunk 72 to carry the logs, b. a chassis frame 74 which directly supports the bunk 72, c. two longitudinally extending walking beams 76 mounted to the lower portion of the chassis frame 74, d. wheels 78 mounted to the forward and rear ends of each walking beam 76, e. a reach tube 80 centrally mounted in the chassis frame 74, and f. a reach 82 mounted in the reach tube.

Of particular significance in the present invention is the manner in which the force loads from the logs on the bunk 72 are transmitted through the chassis frame 74 to the walking beams 76 and in the wheels 78, and more particularly the construction of the chassis frame 74 to enable the force loads to be transmitted through the frame 74 in the most effective manner. The bunk 72 is constructed in substantially the same manner as the prior art bunk 12. Thus there is a main support beam 84 which supports the logs thereon, and a pair of upright stakes 88 on opposite sides of the support beam 84. However, instead of having the bunk 72 mounted to an intermediate bridge beam (such as the bridge beam 14 of the prior art trailer assembly 10), the bunk 72 is mounted directly to the chassis frame 74. Thus, there is a rotary thrust bearing 90 at the center of the support beam 84, this bearing 90 comprising upper and lower plates 92 and 94, respectively, with the upper plate 92 being fixedly connected to the bottom side of the bunk support beam 84, and the lower plate 94 being fixedly connected to the top side of the chassis frame 74.

Two sets of rub irons 96 are provided on opposite sides of the thrust bearing 90, with the upper rub iron 98 of each pair being fixedly connected to the bottom side of the bunk beam 84, and the lower rub iron 100 of each set being fixedly connected to upper lateral end portions of the chassis frame 76. The two rotary bearing plates 92 and 94 are connected one to another by a bolt 102 having its head 103 positioned just beneath the lower bearing plate 94 and extending upwardly through the bunk support beam 84 where it is held by a nut 104.

As indicated earlier herein, the construction of the chassis frame 74 in transmitting loads from the bunk 72 therethrough is critical in the present invention. While the chassis frame 74 is a single rigid frame, functionally it can be considered as being made up of five portions, namely:

a. a main central body portion 106 through which the primary compression loads are transmitted, b. two upper shoulder portions 108 to which the rub iron plates 100 are mounted, and c. two leg portions 110 to which the walking beams 76 are mounted.

The chassis frame is made up of front and rear main plates 112 and 114 which extend substantially over the entire front and rear surfaces of the frame 74. There is a top plate 116 extending across substantially the top frame 74 and two side plates 118 extending from the shoulders 104 down to the bottom of the leg portions 110.

Centrally mounted in the body portion 106 of the frame 74 are four vertically oriented support plates, namely a front plate 120, a rear plate 122 and two side plates 124 connected to one another in a box-like configuration to form a vertical support column beneath the rotary bearing 90. The front and rear support plates 120 and 122 are spaced moderately inside of the front and rear main plates 112 and 114, with the four plates 120-124 extending from the top plate 116 immediately below the lower rotary bearing plate 94 downwardly to the reach tube 80.

The reach tube 80, instead of being positioned with its side walls horizontally and vertically oriented, as in the case of the prior art reach tube 22, is constructed in a manner to better withstand compression loads exerted thereon through the support plates 120-124. Thus, the reach tube 80 has two upper walls 126 and two lower walls 128 joined one to another to define a through opening having a square cross-sectional configuration, with the four walls 126-128 slanted at 45° to the horizontal and vertical axes. Thus, the two upper walls slant at a 45° angle upwardly and inwardly to join each other at an upper ridge line 130, and the two lower walls 128 slant downwardly and inwardly toward one another to join at a lower ridge line 132. The upper and lower walls 126 and 128 join to one another at lateral juncture lines 134.

There are additional inner lower support plates 136 extending from the juncture lines 134 laterally a short distance and then downwardly to form inner walls of the leg portions 110 of the frame 76. The upper portion of these inner support plates are designated 136b, and the lower portions 136b.

The trunion mounts for the two walking beams 76 are designated 138. The walking beams 76 are rigid members which extend both forwardly and rearwardly from their respective trunion mounts 138 to join to front and rear axles 140 and 142, respectively, by suitable mounting members 144 which permit a certain amount of "spring" movement between the walking beams 76 and the axles 140 and 142.

To enable the bolt 102 to be placed in its connecting position, there is provided a vertically aligned tube 146 extending from the topside of the reach tube 80 upwardly to the lower bearing plate 94. This tube 146 has a hexagonal cross-section to receive the hexagonal head 103 of the bolt 102 in a manner to prevent the bolt 102 from turning. The reach tube 80 is provided with lower and upper holes 150 vertically aligned with a tube 146, so that the bolt 102 can be put in place by being moved upwardly through the two holes 150 and into the tube 146 to extend upwardly in its securing position through the bunk support beam 84. A retaining member 151 is provided to prevent the bolt 102 from falling from the tube 146 when the nut 104 is removed.

A reach clamp 152 is provided at the forward end of the reach tube 80 on the upper ridge line 130 thereof. Thus, the reach clamp 152 presses the reach 82 directly downwardly into the reach tube 80. A "V" shaped cable member 154 has its two forward ends connected to the bunk 72 at spaced locations and its rear end connected by a spring 156 to the rear end of the reach 80. This cable and spring arrangement 154-156 resiliently urges the bunk 72 into its laterally extending position. Also, the front and rear axles 140 and 142 are each provided with an upstanding positioning arm 158 which in turn is connected by a respective pivot arm 160 to the chassis frame 74. This prevents the axles 140 and 142 from rotating to an undesired degree about their mounting members 144.

Each of the walking beams 76 are provided with a related strain gauge member, indicated schematically at 162. These strain gauges 162 measure the force transmitted through the two walking beams 76 to determine the weight of the logs 86 carried by the bunk 72. Since such strain gauges 162 are well known in the prior art and commercially available, they will not be described in detail herein. A strain gauge which has been found suitable for use in the present invention is one made by the Structural Engineering Company of Tukwila, Wash.

To describe the operation of the present invention, consideration will be given to the three factors discussed previously with regard to the prior art trailer 10, these three factors being:

a. the manner in which the weight of the logs is supported;

b. the manner in which the trailer assembly is towed; and c. how the weight of the logs is determined.

First, with regard to the manner in which the weight from the logs is transmitted through the structure of the trailer assembly 70 to the ground surface, as indicated previously herein, the bunk 72 is supported directly from the chassis frame 74. With the load of logs 86 distributed evenly on the bunk 72 and with the trailer assembly 70 stationary, the weight of the logs presses on the bunk support beam 84 which bears primarily through the rotary thrust bearing 90 downwardly onto the top center part of the main body portion 106 of the chassis frame 74. The body portion 106 transmits these force loads downwardly and outwardly through the leg portions 110 to the trunion mounts 138, which in turn transmit the loads to the walking beams 76 and the wheels 78.

To describe more particularly how the loads are transmitted from the rotary bearing 90, as indicated previously, there are four support plates 120, 122 and 124 connected one to another to provide in effect a vertically positioned support column 120-124 having a rectangular cross-sectional configuration. This support, 120-124, in turn bears against the two upper walls 126 of the reach 82, and also on the inner edges of the two inner support portions 126a. Since these two upper walls 126 of the reach tube 80 slant upwardly and inwardly toward one another, these two walls 128 act somewhat in the manner of two slanting members of a roof truss to direct the downward compression loads exerted thereon, downwardly and outwardly to supporting structures. A substantial portion of the compression loading on the rotary bearing 90 is also transmitted downwardly and outwardly through the upper middle portions of the front and rear main plates 112 and 114. All of these compressive forces (namely those transmitted through the column-like structure 120-124 and through the front and rear plates 112 and 114) are transmitted downwardly and outwardly through the two leg portions 86. It will be noted that the lower inner support plate portions 136b with the outer lower portions of the front and rear main plates 112 and 114 and with the lower portions of the side plates 118 form the two leg portions 110 in the configuration of box-like column structures which extend upwardly and moderately inwardly toward the rotary bearing 90.

The lower middle portion of the front and rear plates 112 and 114 (i.e. those portions of the plates 112 and 114 positioned below the inner support plate portions 136a and between the plate portions 136b) function substantially as webbing structure to resist forces which tend to move the two leg portions 110 laterally away from one another. Thus, the loads exerted on the lower portions of the front and rear plates 112 and 114 are mainly laterally directed tension loads.

With regard to the function of determining the weight of the logs 76, as indicated previously, this is done by means of the strain gauges 162 connected to the walking beams 76. Since the walking beams 76 are structurally rigid members, the force exerted on the strain gauges 162 is a true indication of the weight of the logs 86.

With regard to towing the trailer assembly 70, as in the prior art, this is done by means of the reach 82 acting through its reach tube 80. However, in the present invention, the reach tube 80, in addition to performing its task of transmitting the pulling force of the reach 82 through the trailer assembly 70, also forms an integral part of the support structure of the main chassis frame 74.

Let us now give consideration to the dynamic loading on the trailer assembly 70 of the present invention. As the wheels 78 on one side of the trailer assembly 70 encounter bumps on the logging road, there are abrupt vertical loads exerted upwardly through the related leg portion 110 of the chassis frame 74. However, in contrast to the prior art trailer assembly 10, which transmits the load substantially entirely upwardly through its related rub iron, the chassis frame 74 transmits such impact loads not only to the shoulder portion 108 directly above, but also upwardly through the main body portion 106 to the thrust bearing 90. Likewise, when the set of wheels 78 on one side of the truck encounter a depression in the road, so that these wheels 78 are unweighted, the weight of the logs 86 is transmitted partially through the opposite should portion 108 and partially through the main body portion 106 downwardly to the opposite leg portion 110.

It has been found that the particular arrangement of this trailer assembly 70 enables the total weight of the trailer assembly 70 to be made lighter (in the order of several hundred pounds) in comparison with the typical prior art logging trailer 10 described previously herein. Yet the trailer assembly 70 of the present invention is well able to perform its essential functions quite satisfactorily and withstand the rigors of a commercial logging operation.

What is claimed is:

1. A trailer assembly adapted to carry a load, such as a load of logs comprising:
   a. a chassis frame having a longitudinal axis, a lateral axis and a vertical axis, said chassis frame comprising:
      1. a central body portion having a top, bottom and two sides,
      2. two laterally spaced leg portions connected to the bottom of said body on opposite sides thereof,
      3. two laterally spaced shoulder portions, located at the top of said body portion on opposite sides thereof,
   b. a load carrying bunk member positioned above said frame and extending laterally over said frame,
   c. support means to support said bunk member on said frame, said support means comprising:
      1. a main rotary thrust bearing mounted to the top of said body portion at the center thereof and transmitting major thrust forces from said bunk member directly to said body portion in a manner to provide major support for said bunk member,
      2. two auxiliary support members mounted to said shoulder portions on opposite sides of said thrust bearing to provide direct auxiliary support for said bunk member on side portions thereof,
   d. a reach tube structure adapted to receive a reach and extending through said body portion at a location beneath said rotary thrust bearing,
   e. plate support means centrally mounted in said body portion and rigidly connected to one another to form a support column which extends vertically from said rotary thrust bearing downwardly to transmit force loads from said rotary thrust bearing downwardly and outwardly to said leg portions,
   f. a pair of walking beams mounted one to each of said leg portions, each walking beam having a center portion mounted for rotation to its related leg portion, and forward and rear ends adapted to be rotatably connected to forward and rear axles,
   g. said walking beams being adapted to carry strain gauge means thereon to measure forces transmitted from said bunk, through said support means to said chassis frame and thence to said walking beams, as a means of determining the weight of the load carried on the bunk.

2. The trailer assembly as recited in claim 1, wherein said support structure comprises forward, rear and side plates rigidly connected to each other in a rectangular configuration.

3. The trailer assembly as recited in claim 1, wherein said reach tube comprises a plurality of flat plates defining a through opening, two of said plates being upper plates joined to one another at an upper ridge line and extending from said ridge line downwardly and outwardly from one another, said two upper plates being fixedly attached to said support structure and being adapted to receive downward force loads thereon from said support structure and to transmit said force loads downwardly and outwardly in said chassis frame.

4. The trailer assembly as recited in claim 3, wherein said reach tube comprises a structure having said two upper plates and two lower plates, said two lower plates slanting from said two upper plates downwardly and inwardly toward one another to define a generally rectangular through opening to receive a reach.

5. The trailer assembly as recited in claim 1, wherein:
   a. said reach tube comprises a plurality of flat plates defining a through opening, two of said plates being upper plates joined to one another at an upper ridge line and extending from said ridge line downwardly and outwardly from one another, said two upper plates being adapted to receive downward thrust loads thereon and to transmit said thrust loads downwardly and outwardly in said chassis frame,
   b. said plate support means are rigidly connected to one another to form a support structure extending from said rotary thrust bearing member downwardly into said body portion and at least partially to said reach tube upper plates.

6. The trailer assembly as recited in claim 1, wherein:
   a. said support structure comprises forward, rear and side plates rigidly connected to each other in a rectangular configuration extending downwardly to said reach tube,
   b. said reach tube comprises two upper plates joined to one another at an upper ridge line and extending downwardly and outwardly therefrom, and two lower plates joined to one another at a lower ridge line and slanting from said lower ridge line upwardly and outwardly to join with said upper plates c. said downward force loads are transmitted from said support structure downwardly at least partially to said reach tube.

7. The trailer assembly as recited in claim 1, wherein:

a. said plate support means are rigidly connected to one another to form a support structure adapted to support vertical force loads, said box-like support structure extending from said rotary thrust bearing member downwardly into said body portion, b. said reach tube comprises a plurality of flat plates defining a through opening, two of said plates being upper plates joined to one another at an upper ridge line and extending from said ridge line downwardly and outwardly from one another, and two of said plates being lower plates joined to one another at a lower ridge line and extending from said ridge line upwardly and outwardly from one another to form with said upper plates, c. each of said leg portions comprising a vertically oriented columnar leg structure extending downwardly from said body portion to receive vertical thrust loads from said body portion, d. said chassis frame comprising web reinforcing means extending between said leg portions to resist lateral thrust loads exerted on said leg portions produced by downward and outward thrust loads exerted from said rotary thrust bearing downward and outward through said body portion to said leg portions.

8. The trailer assembly as recited in claim 1, wherein:

a. said plate support means are rigidly connected to one another to form a support structure adapted to support vertical force loads, said support structure extending from said rotary thrust bearing member downwardly into said body portion, b. said reach tube comprises a plurality of flat plates defining a through opening, two of said plates being upper plates joined to one another at an upper ridge line and extending from said ridge line downwardly and outwardly from one another, and two of said plates being lower plates joined to one another at a lower ridge line and extending from said ridge line upwardly and outwardly from one another to form with said upper plates, c. each of said leg portions comprising a vertically oriented columnar leg structure extending downwardly from said body portion to receive vertical thrust loads from said body portion, d. said chassis frame comprising web reinforcing means extending between said leg portions to resist lateral thrust loads exerted on said leg portions, e. said leg portions being support members for said chassis central body portion, each of said leg portions having front, rear and side plate members rigidly joined to one another defining a structure therein, said leg portions being adapted to support vertical force loads transmitted downwardly through said leg portions from said rotary thrust bearing and said reach tube.

9. The trailer assembly as recited in claim 1, wherein there is a forward axle extending between the forward ends of said two walking beams, and a rear axle extending between the rear ends of said walking beams, said trailer assembly further comprising yielding positioning means connected from said chassis frame to said axles in a manner to yieldingly resist rotational movement of said axles relative to said walking beams, said assembly further comprising two strain gauges connected to said walking beams, whereby total thrust loads transmitted to said walking beams is properly measured.

* * * * *